United States Patent [19]

Shibata et al.

[11] Patent Number: 4,649,009

[45] Date of Patent: Mar. 10, 1987

[54] PROCESS FOR PRODUCING A HEAT-SHRINKABLE POLYPROPYLENE FILM

[75] Inventors: Kizo Shibata; Kazuo Dodo, both of Nagahama, Japan

[73] Assignee: Mitsubishi Plastics Industries, Limited, Tokyo, Japan

[21] Appl. No.: 763,251

[22] Filed: Aug. 7, 1985

[30] Foreign Application Priority Data

Aug. 13, 1984 [JP] Japan .................................. 59-169026

[51] Int. Cl.$^4$ ............................................. B29C 55/14
[52] U.S. Cl. ................................. 264/235.8; 264/290.2
[58] Field of Search ............... 264/235.6, 235.8, 290.2, 264/210.7

[56] References Cited

U.S. PATENT DOCUMENTS

| | | | |
|---|---|---|---|
| 3,223,764 | 12/1965 | Kahn et al. ........................ | 264/235.8 |
| 3,265,769 | 8/1966 | Schaffhausen ................... | 264/290.2 |
| 3,551,546 | 12/1970 | Gosper et al. ................... | 264/290.2 |
| 3,773,609 | 11/1973 | Haruta et al. .................... | 264/290.2 |
| 3,808,304 | 4/1974 | Schirmer .......................... | 264/290.2 |
| 3,900,534 | 8/1975 | Schard ............................. | 264/290.2 |
| 4,335,069 | 6/1982 | Levy ................................. | 264/290.2 |
| 4,343,852 | 10/1982 | Isaka et al. ....................... | 264/290.2 |

FOREIGN PATENT DOCUMENTS

| | | | |
|---|---|---|---|
| 671029 | 9/1963 | Canada ............................ | 264/290.2 |
| 892006 | 3/1962 | United Kingdom ............. | 264/290.2 |
| 2078158 | 1/1982 | United Kingdom ............. | 264/290.2 |

*Primary Examiner*—James Lowe
*Attorney, Agent, or Firm*—Oblon, Fisher, Spivak, McClelland & Maier

[57] ABSTRACT

A process for producing a heat-shrinkable polypropylene film, which comprises stretching a film of a polypropylene resin firstly in one direction, then heat-treating it, and further stretching it in a direction perpendicular to the direction of the first stretching.

6 Claims, No Drawings

PROCESS FOR PRODUCING A HEAT-SHRINKABLE POLYPROPYLENE FILM

BACKGROUND OF THE INVENTION

The present invention relates to a heat-shrinkable polypropylene film.

Heretofore, as heat shrinkable films of polypropylene type, there have been widely used biaxially stretched polypropylene films, which are equally biaxially stretched and which have substantially the same heat shrinkability in both longitudinal and transverse directions. The films of this type are suitable for shrink-wrapping an object such as a fast food entirely. However, they are not suitable for use in a case where the shrinkage in one direction is required, as in the case of shrink-wrapping of e.g. a cylindrical bottle.

For this purpose, there has been proposed an unbalance stretched polypropylene film which is stretched primarily in one direction, as disclosed in e.g. Japanese Unexamined Patent Publication No. 77533/1982.

When heated, such an unbalance stretched polypropylene film shows a great shrinkage in the direction of the stretching, but its physical properties such as the tensile strength, are unbalanced as between the longitudinal and transverse directions, with poor physical properties in the direction perpendicular to the stretching direction. Therefore, it has a difficulty such that even when it is used to cover a glass bottle, it does not provide adequate effectiveness to prevent the scattering of the glass bottle fragments when the bottle is broken.

SUMMARY OF THE INVENTION

Accordingly, it is an object of the present invention to provide a heat-shrinkable polypropylene film, which has a greater shrinkability in one direction than in the other direction, and which has good and balanced physical properties in both the longitudinal and transverse directions.

The present invention provides a process for producing a heat-shrinkable polypropylene film, which comprises stretching a film of a polypropylene resin firstly in one direction, then heat-treating it, and further stretching it in a direction perpendicular to the direction of the first stretching.

DESCRIPTION OF THE PREFERRED EMBODIMENTS

Now, the present invention will be described in detail with reference to the preferred embodiments.

As the polypropylene resin in the present invention, there may be mentioned, in addition to a homopolymer of propylene, a copolymer of propylene with other olefin such as ethylene or butene-1, or a mixture thereof. It is of course possible to add various additives thereto.

The polypropylene resin is molded into a film usually by melt extrusion from an ordinary T-die and cooling.

The film thereby obtained is stretched firstly in one direction at a usual stretching temperature and at a usual stretching ratio, i.e. within a temperature range of less than the melting point and not less than 50° C. below the melting point of the polypropylene resin used, and at a stretching ratio of from 2 to 10 times, preferably from 4 to 7 times.

Then, the film stretched in one direction is subjected to heat treatment. For the heat treatment, the film is heated at a temperature within a range of less than the melting point and not less than 30° C. below the melting point of the polypropylene resin, preferably at a temperature higher than the temperature for the first stretching, while maintaining the stretched film dimension or, if necessary, after subjecting the film to a certain relaxing treatment. The heat treatment time may suitably be adjusted depending upon e.g. the heating temperature. However, the treatment is usually effective when the treating time is at least two seconds, and for the practical industrial purposes, the treating time is not longer than 180 seconds.

Then, the second stretching is conducted in a direction perpendicular to the direction of the first stretching. This second stretching is conducted usually at a temperature within a range of from 10° to 60° C. below the melting point at a stretching ratio of from 1.5 to 7 times, preferably from 3 to 5 times. If the stretching ratio is less than 1.5 times, the thermal shrinkability of the film thereby obtained will be too small, and if the stretching ratio is greater than 7 times, the shrinkability will be imparted also in the direction of the first stretching. Therefore, it is desirable that the stretching ratio is from 1.5 to 7 times.

By the first stretching in one direction, it is possible to impart an adequate physical strength in the direction of the stretching of the film. Then, the monoaxially stretched film is subjected to heat treatment, whereby the polypropylene resin is crystallized, and it is thereby possible to control the heat shrinkage due to the first stretching. By the subsequent second stretching in the direction perpendicular to the direction of the first stretching, the heat shrinkability in that direction is imparted, whereby it is possible to obtain an excellent heat-shrinkable film having balanced physical strength in both the longitudinal and transverse directions and yet substantial heat shrinkability only in one direction.

It is advantageous to conduct the first stretching in a winding-up direction and the second stretching in a direction perpendicular to the winding-up direction so that the width of the winding-up roll can be kept relatively small.

The polypropylene resin crystallizes relatively easily, and it may happen that during the step of the heat treatment, the crystallization proceeds too much, whereupon the second stretching can hardly be conducted. In order to control the crystallization and to facilitate the adjustment of the heat treating conditions, it is preferred that the heat of crystallization ($\Delta Hc$) of the polypropylene resin is adjusted within a range of from 7 to 15 cal/g. The polypropylene resin having heat of crystallization exceeding 15 cal/g is highly crystallizable, and with such a material, it is difficult to control the heat treating conditions to obtain a proper crystallization degree. If the heat of crystallization is less than 7 cal/g, the resin tends to be adhesive and tends to have poor processability, and the physical strength of the film thereby obtained tends to be poor. For these reasons, the heat of crystallization is preferably within the above-mentioned range.

The polypropylene resin having the heat of crystallization within the above-mentioned range, may be selected from propylene polymers such as random copolymers of propylene with other olefins, which have relatively irregular molecular structures and which are hardly crystallizable, or may be prepared by mixing a propylene polymer having heat of crystallization of greater than 15 cal/g with a propylene polymer having a smaller heat of crystallization.

Further, it is possible to add from 10 to 50% by weight of petroleum resin, particularly hydrogenated petroleum resin, to the propylene polymer to reduce the crystallizability and to adjust the heat of crystallization ($\Delta$Hc) to a level of from 7 to 15 cal/g. If the amount of the petroleum resin is less than 10% by weight, no adequate effectiveness of the incorporation is obtainable. On the other hand, if the amount exceeds 50% by weight, the resin tends to be adhesive and tends to have poor processability, and the physical strength of the film thereby obtained tends to be poor. Further, by the incorporation of the petroleum resin, there is an additional effect that it is thereby possible to obtain a film which scarcely undergoes spontaneous shrinkage.

When a polypropylene resin having relatively small heat of crystallization is employed, it is possible to obtain a film having high shrinkability even when heated at a relatively low temperature at a level of e.g. 100° C. This is advantageous particularly for the shrink-wrapping of e.g. a container which is not durable at a high temperature.

In the present invention, the heat of crystallization ($\Delta$Hc) of the polypropylene resin was calculated from the surface area of the crystallization peak in the chart obtained by the measurement by a differential scanning calorimeter (manufactured by Perkin Elmer Co.) at a temperature lowering rate of 10° C./min. The melting point was measured by the above-mentioned differential scanning calorimeter at a temperature raising rate of 10° C./min, and the temperature at the melting peak was taken as the melting point.

According to the present invention it is possible to obtain a heat-shrinkable polypropylene film having excellent physical properties well balanced in both the longitudinal and transverse direction and excellent heat shrinkability in only one direction. Such a film is useful particularly for labels for bottles.

Now, the present invention will be described in further detail with reference to Examples. However, it should be understood that the present invention is by no means restricted by these specific Examples.

EXAMPLES 1 to 5

The following three types of resins A, B and C were melt-mixed in the proportions as identified in Table 1 and pelletized. The pellets thereby obtained were melt-extruded from a T-die at a temperature of about 200° C. to obtain a film having a thickness of 1.2 mm.

Resin A:
Propylene-ethylene-random copolymer (melting point: 145° C., $\Delta$Hc: 16.5 cal/g)

Resin B:
Propylene-$\alpha$-olefin random copolymer (melting point: 144° C., $\Delta$Hc: 7.5 cal/g)

Resin C:
Hydrogenated petroleum resin (tradename Arcon P125, manufactured by Arakawa Chemical Industries Co. Ltd.)

Then, this film was heated to 110° C. and stretched six times between a pair of stretching rolls having different circumferential speeds in the winding-up direction.

Then, while maintaining this dimension, the stretched film was contacted to a heat treating roll adjusted at 130° C. and heat-treated for from 5 to 60 seconds as identified in Table 1.

Further the film was stretched four times in the transverse direction in a tenter adjusted at a temperature of 100° C.

The stretched film thereby obtained having a thickness of about 50 $\mu$m was dipped in hot water of 100° C. for 5 minutes, whereby the shrinking rates (%) in the longitudinal and transverse directions were measured, and the tensile strength (kg/cm$^2$) in the longitudinal and transverse directions were measured in accordance with JIS K6732. The results are shown in Table 1.

COMPARATIVE EXAMPLES 1 and 2

The same pellets as used in the Examples were melt-extruded at 200° C. from a T-die to obtain films having a thickness of 0.3 mm and 1.2 mm, respectively, which were used for Comparative Examples 1 and 2, respectively.

Then, the film for Comparative Example 1 was stretched six times in the transverse direction by a tenter without the longitudinal stretching or heat treatment.

The film for Comparative Example 2 was stretched six times at 110° C. in the longitudinal direction in the same manner as in the Examples, and then without heat treatment, stretched four times at 100° C. in the transverse direction by the tenter in the same manner as in the Examples.

The films obtained in Comparative Examples 1 and 2 having a thickness of about 50 $\mu$m were evaluated with respect to the shrinking rates and tensile strength in the same manner as in the Examples. The results are shown in Table 1.

TABLE 1

| | Example | | | | | Comparative Example | |
|---|---|---|---|---|---|---|---|
| | 1 | 2 | 3 | 4 | 5 | 1 | 2 |
| Resin A (wt. %) | 50 | 70 | 60 | 40 | 100 | 40 | 40 |
| Resin B (wt. %) | 50 | — | — | 40 | — | 40 | 40 |
| Resin C (wt. %) | — | 30 | 40 | 20 | — | 20 | 20 |
| Melting point (°C.) | 144 | 139 | 138 | 138 | 145 | 138 | 138 |
| Heat of crystallization $\Delta$Hc (cal/g) | 12.0 | 12.2 | 10.9 | 9.7 | 16.5 | 9.7 | 9.7 |
| Longitudinal stretching temperature (°C.) | 110 | 110 | 110 | 110 | 110 | No stretching | 110 |
| Longitudinal stretching rate (times) | 6 | 6 | 6 | 6 | 6 | | 6 |
| Heat treating temperature (°C.) | 130 | 130 | 130 | 130 | 130 | No heat treatment | No heat treatment |
| Heat treating time (sec.) | 60 | 60 | 60 | 60 | 5 | | |
| Transverse stretching temperature (°C.) | 100 | 100 | 100 | 100 | 100 | 100 | 100 |
| Transverse stretching rate (times) | 4 | 4 | 4 | 4 | 4 | 6 | 4 |
| Longitudinal heat shrinking rate (%) | 7 | 7 | 6 | 5 | 10 | 0 | 20 |
| Transverse heat shrinking rate (%) | 45 | 51 | 53 | 55 | 38 | 25 | 33 |
| Longitudinal tensile strength (kg/cm$^2$) | 1200 | 1150 | 1020 | 1020 | 1450 | 330 | 1030 |
| Transverse tensile strength (kg/cm$^2$) | 1090 | 1040 | 950 | 950 | 1200 | 1700 | 930 |

It is evident from Table 1 that in Comparative Example 1 wherein monoaxial stretching is conducted only in the transverse direction, the tensile strength in the longitudinal direction is extremely small at a level of 330 kg/cm² as compared with the tensile strength of 1700 kg/cm² in the transverse direction. Besides, the heat shrinking rate in the transverse direction is not so large at a level of 25%. Further, in Comparative Example 2 wherein the transverse stretching was conducted subsequent to the longitudinal stretching without heat treatment, the film obtained had a tensile strength of 1030 kg/cm² in the longitudinal direction and 930 kg/cm² in the transverse direction, and thus the tensile strength is well balanced. However, the film had a heat shrinking rate of 20% in the longitudinal direction and 33% in the transverse direction, and thus undergoes shrinkage in both directions, thus indicating that it is not useful for an application where monoaxial shrinkage is required, as in the case of labels for bottles.

Whereas, in each of Examples 1 to 5 wherein the longitudinal stretching is followed by the heat treatment and then the transverse stretching, the tensile strength in both the longitudinal and transverse directions is as great as from 950 to 1450 kg/cm², and thus is well balanced, and yet it has a great heat shrinking rate at a level of from 38 to 55% only in the transverse direction attributable to the second stretching and a minimum shrinking rate at a level of from 5 to 10% in the longitudinal direction. Thus, when the films of the Examples are used for labelling, a clean finish will be obtained, which has excellent effectiveness to prevent the scattering of broken fragments. Further, in Examples 1 to 4 wherein the heat of crystallization ΔHc is not higher than 15 cal/g, particularly excellent shrinking characteristics were obtained with the transverse shrinking rate of from 45 to 55% and the longitudinal shrinking rate of from 5 to 7%.

We claim:

1. A process for producing a heat-shrinkable polypropylene film having balanced physical strength in both the longitudinal and transverse directions and having substantial heat shrinkability only in one direction, which comprises stretching a film of a polypropylene resin firstly in one direction, then heat-treating it at a temperature within a range of less than the melting point of the resin and not less than 30° C. below the melting point of the resin, and higher than the temperature for the first stretching, and further stretching it in a direction perpendicular to the direction of the first stretching at a temperature lower than the temperature for the heat-treatment by at least 10° C.

2. The process according to claim 1, wherein the polypropylene resin has heat of crystallization of from 7 to 15 cal/g.

3. The process according to claim 2 wherein the polypropylene resin comprises from 50 to 90% by weight of a propylene polymer and from 10 to 50% by weight of a petroleum resin.

4. The process according to claim 1, wherein the first stretching is conducted at a stretching ratio of from 2 to 10 times.

5. The process according to claim 1, wherein the heat treatment is conducted for from 2 to 180 seconds.

6. The process according to claim 1, wherein the further stretching is conducted at a temperature within a range of from 10° to 60° C. below the melting point of the resin and at a stretching rate of from 1.5 to 7 times.

* * * * *